US007649575B2

(12) United States Patent
Mamba et al.

(10) Patent No.: US 7,649,575 B2
(45) Date of Patent: Jan. 19, 2010

(54) LIQUID CRYSTAL DISPLAY DEVICE WITH IMPROVED RESPONSE SPEED

(75) Inventors: Norio Mamba, Kawasaki (JP); Takashi Shoji, Fujisawa (JP); Toshimitsu Matsudo, Tokyo (JP)

(73) Assignee: Hitachi Displays, Ltd., Chiba-ken (JP)

( * ) Notice: Subject to any disclaimer, the term of this patent is extended or adjusted under 35 U.S.C. 154(b) by 939 days.

(21) Appl. No.: 11/157,785

(22) Filed: Jun. 22, 2005

(65) Prior Publication Data

US 2006/0010404 A1 Jan. 12, 2006

(30) Foreign Application Priority Data

Jul. 6, 2004 (JP) ............................ 2004-199436

(51) Int. Cl.
*H04N 3/14* (2006.01)
*G09G 3/36* (2006.01)
*G09G 5/10* (2006.01)

(52) U.S. Cl. ......................... 348/790; 345/87; 345/690

(58) Field of Classification Search ......... 348/790–793, 348/189, 607, 617–621, 625, 630; 345/87–90, 345/690

See application file for complete search history.

(56) References Cited

U.S. PATENT DOCUMENTS 5,687,132 A * 11/1997 Rao ...................... 365/230.03
6,542,143 B1 * 4/2003 Ozawa ........................ 345/98
2001/0027556 A1 * 10/2001 Shimosako et al. ............ 725/1
2002/0030652 A1 * 3/2002 Shibata et al. ................ 345/87
2002/0180765 A1 * 12/2002 Tanaka et al. ............... 345/690
2002/0186192 A1 * 12/2002 Maruoka et al. .............. 345/87
2004/0008215 A1 * 1/2004 Shimizu et al. ............. 345/690
2004/0263450 A1 * 12/2004 Lee et al. ...................... 345/87

FOREIGN PATENT DOCUMENTS

JP 4-288589 10/1992
JP 2002-132225 5/2002

* cited by examiner

*Primary Examiner*—Victor R Kostak
(74) *Attorney, Agent, or Firm*—Antonelli, Terry, Stout & Kraus, LLP.

(57) ABSTRACT

A display device displays corrected externally-supplied video signals, and includes plural pixels, a scanning driver and a signal driver which applies display voltages to signal lines coupled to the pixels. The signal driver includes a first converter which converts a format of the externally supplied video signals into a first format, a memory which stores the video signals from the first converter temporarily, a correction circuit which computes correction values based upon the video signals from the first converter and the video signals in the memory and corrects the video signals from the first converter based upon the correction values, and a second converter which converts the first format of the video signals from the correction circuit to a format of the display voltages. The memory stores the correction values also, and the correction circuit corrects the video signals in the memory based upon the correction values in the memory.

15 Claims, 7 Drawing Sheets

LIQUID CRYSTAL DISPLAY DEVICE WITH IMPROVED RESPONSE SPEED

CLAIM OF PRIORITY

The present application claims priority from Japanese application serial no. 2004-199436 filed on Jul. 6, 2004, the content of which is hereby incorporated by reference into this application.

BACKGROUND

The present invention relates to a display device and a driving method thereof for driving pixels by using a signal driver circuit provided with a memory, and in particular, to a liquid crystal display device and a driving method thereof for speeding up a response speed of liquid crystal for the purpose of improving the performance of displaying moving images.

In liquid crystal display devices, due to the slow response speed of liquid crystal, smearing and blurring occur in a display of moving images, and the quality of the displayed image is degraded. JP-A-4-288589 discloses a liquid crystal display device which speeds up the response speed of liquid crystal for the purpose of improving the quality of displayed images by eliminating occurrence of smearing and blurring in a display of moving images. In a case where frame-image signals are supplied to a liquid crystal display device successively in synchronism with a frame period of the liquid crystal display device from an external display signal source, the liquid crystal display device disclosed in JP-A-4-288589 is provided with a frame memory for storing image signals for an entire frame and a means for detecting time-varying changes between the frame-image signals stored in the frame memory and externally supplied frame-image signals. This liquid crystal display device corrects the supplied frame-image data so as to speed up the response speed by using an adaptive filter capable of varying its filter characteristics based upon the amount of the detected changes.

Recently there have been increasing opportunities for displaying moving images even on mobile equipment typified by mobile phones, since the mobile equipment can receive TV broadcasts now, for example. Therefore there has been a demand for improvement in moving-image displaying performance on small-sized liquid crystal display devices used for mobile phones. For the purpose of reducing power consumption by transferring video signals, liquid crystal display devices used for mobile phones employ a signal driver having a built-in frame memory capable of storing image signals for at least one frame. The signal source (a CPU, for example) which controls the liquid crystal display device does not transfer all the video signals for an entire frame at the changeover of images, but transfers to the signal driver, video signals associated only with pixels having undergone changes, and thereby changes image signals stored in the frame memory. The signal source reads out frame-image data from the frame memory in accordance with the frame frequency of the liquid crystal display device, and displays an image.

Generally, the frame rate of video signals transferred to the liquid crystal display device from the CPU is lower than the frame frequency (60 Hz, for example) of driving of the liquid crystal display, and therefore the liquid crystal display device displays the same frame image stored in the frame memory of the signal driver several times. In this case, in order to improve the quality of moving images displayed on the liquid crystal display devices used for mobile phones, the above-mentioned driving needs to be applied only to the first frame immediately after the changeover of images.

To correct video data for moving images, TV broadcasts and the like, JP-A-2002-132225 discloses a liquid crystal display device for improving gray scale displaying characteristics by correcting luminance signals and color-difference signals based upon features in an immediately preceding frame, and values of luminance signals and color-difference signals in the immediately preceding frame, by employing an image-quality correcting device comprised of a first signal converting means for converting supplied R, G and B signals into luminance and color-difference signals, a frame-feature extracting means for extracting features of luminance signals every frame, a signal correcting means for correcting luminance and color-difference signals, and a second signal converting means for luminance and color-difference signals outputted from the signal correcting means into R, G and B signals.

SUMMARY OF THE INVENTION

Since the present-day system of the liquid crystal display device used for mobile phones is provided with a built-in frame memory capable of storing image signals for only one frame (a still frame), the frame memory can store one frame of video signals supplied (of moving images), but it does not have an area for storing the amount of changes of incoming video signals from the video signals stored in the frame memory (the amount of difference, or the amount of overdrive of liquid crystal). Here, if the frame memory is operated so as to store video signals corrected (overdriven) in the frame memory by being subjected to a filtering process based upon the amount of changes of the incoming video signals from the video signals having been stored in the frame memory, in the case of displaying video signals corrected at a period earlier than a frame period of incoming video signals, displaying of the corrected video signals is repeated at periods earlier than the times of the changeover of images of incoming video signals, and consequently, the amount of correction (the amount of overdrive) becomes excessive, images other than intended images are displayed, and the quality of the images are degraded.

It is an object of the present invention to provide a display device which is provided with a signal driver having a built-in memory and controlled by a CPU or the like, and which is capable of improving the quality of a display of moving images.

A display device in accordance with the present invention comprises: a display section having a plurality of scanning lines, a plurality of signal lines intersecting the plurality of scanning lines, and a plurality of pixels disposed correspondingly to intersections of the scanning lines and the signal lines; a scanning driver which applies a scanning signal to the scanning lines; a signal driver which applies display voltages to the signal lines display voltages intended for pixels coupled to one of the scanning lines supplied with a selection voltage by the scanning signal; and a power supply circuit which supplies various kinds of voltages to the display section, the scanning driver and the signal driver. The signal driver comprises: a memory which is capable of storing video signals corresponding to the display section; a signal converting means which converts input video signals inputted from an external signal source into video signals of a format different from a format of the input video signals from the external signal source; a correction level computing circuit which computes correction levels based upon the two video signals, that is, the video signals converted by the signal converting means and video signals having been stored in the memory prior to the inputting of the input video signals from the external signal source, and then outputs the correction levels and the video signals having been converted by the signal converting means; a correction circuit which performs correction on video signals based upon the correction level; and a signal re-converting means which converts a format of the video signals having been processed by the correction circuit to a format of the display voltages. The memory stores the correction levels outputted from the correction level computing circuit and the video signals, and when the display section produces a display, the correction levels and the video signals are read out from the memory, and the correction circuit performs correction on the video signals based upon the correction levels.

The present invention is capable of increasing a response speed of liquid crystal for example, only at the time of the changeover of video signals, even in a case where a frame rate video signals transferred from a signal source is lower as compared with the frame frequency of the display device, and consequently, the present invention is capable of producing a high-quality display of moving images on mobile phones.

Further, even in a case where video signals transferred from a signal source are composed only of video signals of pixels having experienced changes in their video signals and their addresses, the present invention is capable of increasing a response speed of liquid crystal for example, only at the time of the changeover of video signals, and consequently, the present invention is capable of producing a high-quality display of moving images.

Since, for performing of the above-mentioned processing, it is only necessary to provide a frame memory for use with the display section at least, an additional memory is not needed, and therefore a high-quality display of moving images can be produced with a limited increase in circuit scale.

Further, since the YUV-RGB conversion circuit is provided in the signal driver of the display device, the display device is compatible with both the RGB and YUV formats of video signals transferred from an external signal source.

Further, since the processing circuit which improves the performance of displaying of moving images is included in the signal driver of the display device, the need for an additional processing circuit IC is eliminated which improves the performance of displaying of moving images.

BRIEF DESCRIPTION OF THE DRAWINGS

In the accompanying drawings, in which like reference numerals designate similar components throughout the figures, and in which.

DETAILED DESCRIPTION OF THE PREFERRED EMBODIMENTS

Example 1

Example 1 of a display device and a method of driving the display device in accordance with the present invention will be explained by reference to FIGS. 1 to 4.

Figure 1:
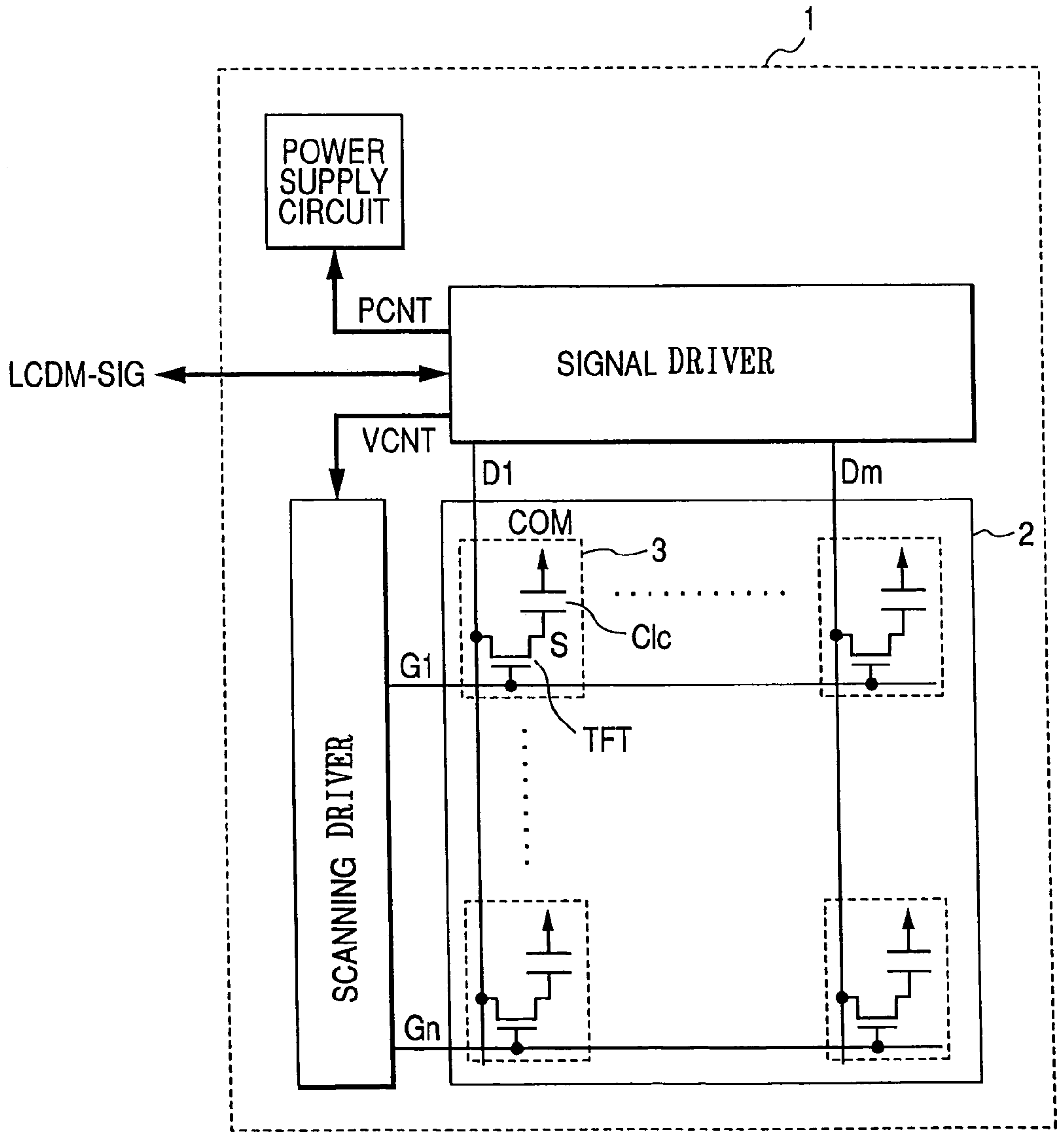
FIG. 1 is a rough illustration of a liquid crystal display device in accordance with an embodiment of Example 1 of the present invention.

FIG. 1 is a schematic diagram illustrating a configuration of a liquid crystal display device in accordance with Example 1. The following will explain the configuration of the liquid crystal display device in accordance with Example 1. By way of example, the liquid crystal display device 1 is comprised of a liquid crystal display section 2 formed of m pixels arranged in a horizontal direction and n pixel-lines arranged in a vertical direction, a signal driver, a scanning driver, and a power supply circuit.

The liquid crystal display section 2 is provided with n scanning lines G1, G2, . . . , Gn, and m signal lines D1, D2, . . . , Dm extending in such a direction as to intersect the scanning lines G. The pixels 3 are disposed in the vicinities of the intersections of the scanning lines G and the signal lines D, respectively. Therefore the liquid crystal display section 2 has a matrix formed of the number m of pixels 3 arranged in the horizontal direction and the number n of pixels 3 arranged in the vertical direction.

Each of the pixels 3 is comprised of a switching element TFT (hereinafter referred to simply as a TFT), a liquid crystal capacitance Clc, and a pixel electrode S and a counter electrode COM which serve to apply a voltage to the liquid crystal capacitance Clc. By way of example, FIG. 1 illustrates a case where a thin film transistor is used as the TFT, but the TFT is not limited to the thin film transistor. Although not shown in FIG. 1, each of the pixels 3 is provided with a compensating capacitance Cstg connected to its pixel electrode S.

TFTs are formed of amorphous Si, polycrystalline Si, single-crystal Si or the like. A gate terminal of a TFT is connected to a corresponding one of the scanning lines G, a drain terminal of the TFT is connected to a corresponding one of the signal lines D, and a source terminal of the TFT is connected to a corresponding one of the pixel electrodes S.

The signal driver receives a signal LCDM-SIG for the liquid crystal display device 1 from a CPU which controls the liquid crystal display device 1 or transmits the signal LCDM-SIG to the CPU. The signal driver generates display voltages to be applied to the liquid crystal based upon video signals transferred by the signal LCDM-SIG, and then applies the display voltages to the signal lines D in the liquid crystal display section 2.

The scanning driver receives a scanning-driver control signal VCNT supplied from the signal driver, and then applies a scanning signal to the scanning lines G in the liquid crystal display section 2. The power supply circuit receives a power-supply-circuit control signal PCNT supplied from the signal driver, and then generates and outputs various voltages necessary for the signal driver, the scanning driver and the liquid crystal display section 2.

The following will explain operation of displaying images on the liquid crystal display device 1 of Example 1 illustrated in FIG. 1.

The liquid crystal display device 1 applies a counter reference voltage VCOM to the counter electrode COM and also applies display voltages generated by the signal driver based upon video signals for respective ones of the pixels 3 to the respective ones of the pixel electrodes S, and produces a multiple-gray-scale display by causing the liquid crystal capacitance to retain liquid-crystal-applied voltages in the liquid crystal capacitance Clc in accordance with the video signals.

Here to avoid deterioration of the liquid crystal capacitance Clc, it is necessary to apply alternately positive-polarity display voltages which are display voltages higher than the counter reference voltage VCOM and negative-polarity display voltages which are display voltages lower than the counter reference voltage VCOM. Therefore, the liquid crystal display device 1 rewrites the liquid-crystal-applied voltages to be retained in the liquid crystal capacitances Clc of the respective pixels 3, with a fixed period (hereinafter referred to as a frame period). The frame period can be selected arbitrarily, and in the following explanation, the frame period is selected to be 1/60 sec by way of example.

Each of the scanning lines G is supplied with a scanning signal from the scanning driver controlled by scanning-driver control signal VCNT. Each of the scanning lines G is supplied with a selection voltage by a scanning signal at least once during one frame period. For example, in a case where TFTs are of the n-type, for example, a signal of a higher voltage is the selection voltage. The TFT in each of the pixels 3 connected to the scanning line G is turned ON when the selection voltage is applied to its gate terminal, and thereby the pixel electrode S is supplied with a display signal in accordance with a video signal for the associated pixel 3 transferred by the signal line D.

Thereafter, the scanning driver outputs a non-selection voltage (a voltage of a lower voltage in the case of the n-type TFT) to the scanning line G. The TFT having its gate terminal supplied with the non-selection voltage is turned OFF, and retains the display voltage previously transferred from the signal line D in the liquid crystal capacitance Clc. By performing this operation for the scanning lines from G1 to Gn during one frame period, the liquid crystal display device 1 can produce a multiple-gray-scale display in accordance with the video signals corresponding to m×n pixels (hereinafter referred to as one frame of video signals).

Next the configuration and operation of the signal driver in Example 1 will be explained by reference to FIG. 2. The signal driver comprises an LCDM controller 4, a video data processor 5, a gray scale voltage generator 6 and a display voltage output circuit 7.

The LCDM controller 4 receives display-condition control signals including a frame period, various kinds of setting information for setting of various voltages, a driving method and others by the signal LCDM-SIG, and generates and outputs the scanning-driver control signal VCNT, the power-supply-circuit control signal PCNT, a control signal DCNT for controlling the video data processor 5 within the signal driver, and a control signal RCNT for controlling the gray scale voltage generator 6. Further, the LCDM controller 4 outputs video signals in-RGB transferred by the signal LCDM-SIG to the video data processor 5.

Figure 2:
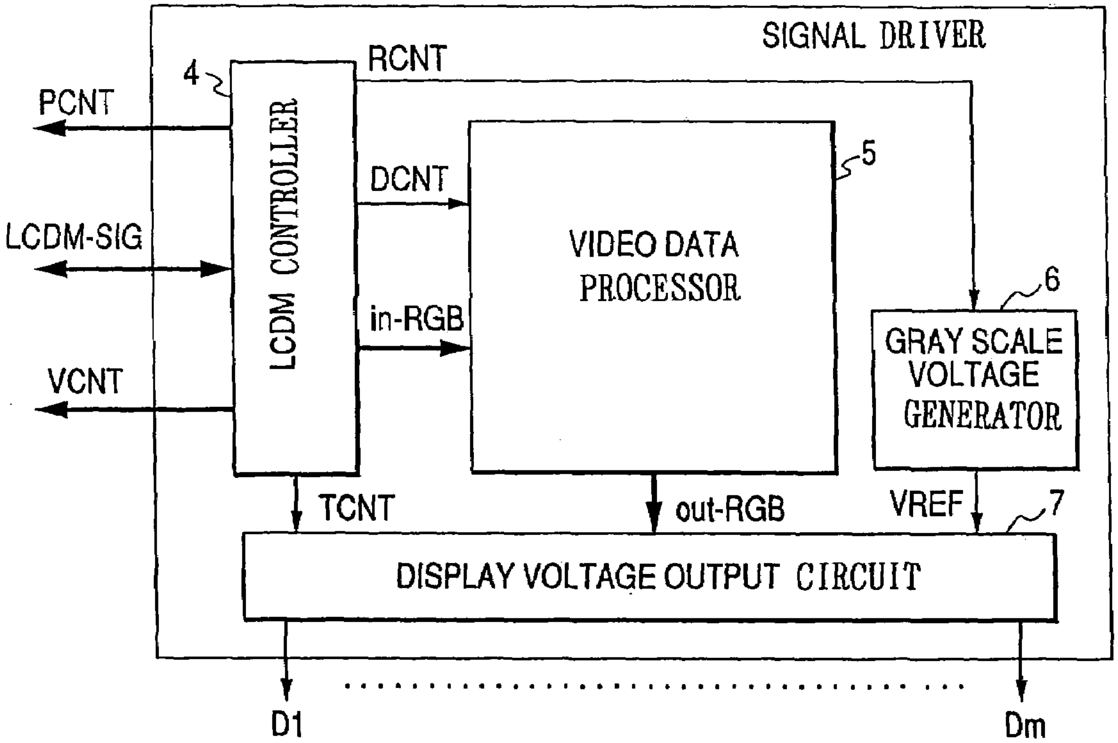
FIG. 2 is a block diagram of a signal driver in Example 1 of the present invention.

In FIG. 2, by way of example, in the following explanation, the transferred video signals are considered to be red (R), green (G) and blue (B) signals. Further the LCDM controller 4 transfers to the CPU by the signal LCDM-SIG, the timing at which the video data processor 5 can receive the video signals in-RGB in accordance with the operating condition of the video data processor 5.

The video data processor 5 is controlled by the control signal DCNT, and stores the video signals in-RGB outputted by the LCDM controller 4. Further, the video data processor 5 outputs video signals out-RGB necessary for generating of display voltages by the display voltage output circuit 7.

The gray scale voltage generator 6 generates the gray scale reference voltages VREF set by the control signal RCNT and outputs them to the display voltage output circuit 7.

The display voltage output circuit 7 is controlled by a timing control signal TCNT outputted by the LCDM controller 4, generates display voltages in accordance with the video signals outputted from the video data processor 5 based upon the gray scale reference voltages VREF, and outputs the display voltages to the signal lines D of the liquid crystal display section 2 to which corresponding ones of the pixels 3 are coupled.

At the time when the display voltage output circuit 7 outputs the display voltages, the scanning driver controlled by the scanning-driver control signal VCNT applies the selection voltage to a corresponding one of the scanning lines G extending horizontally, and thereby the display voltages in accordance with the video signals can be applied to and retained in corresponding ones of the pixels 3 in the corresponding ones of the horizontal scanning lines G.

Figure 3:
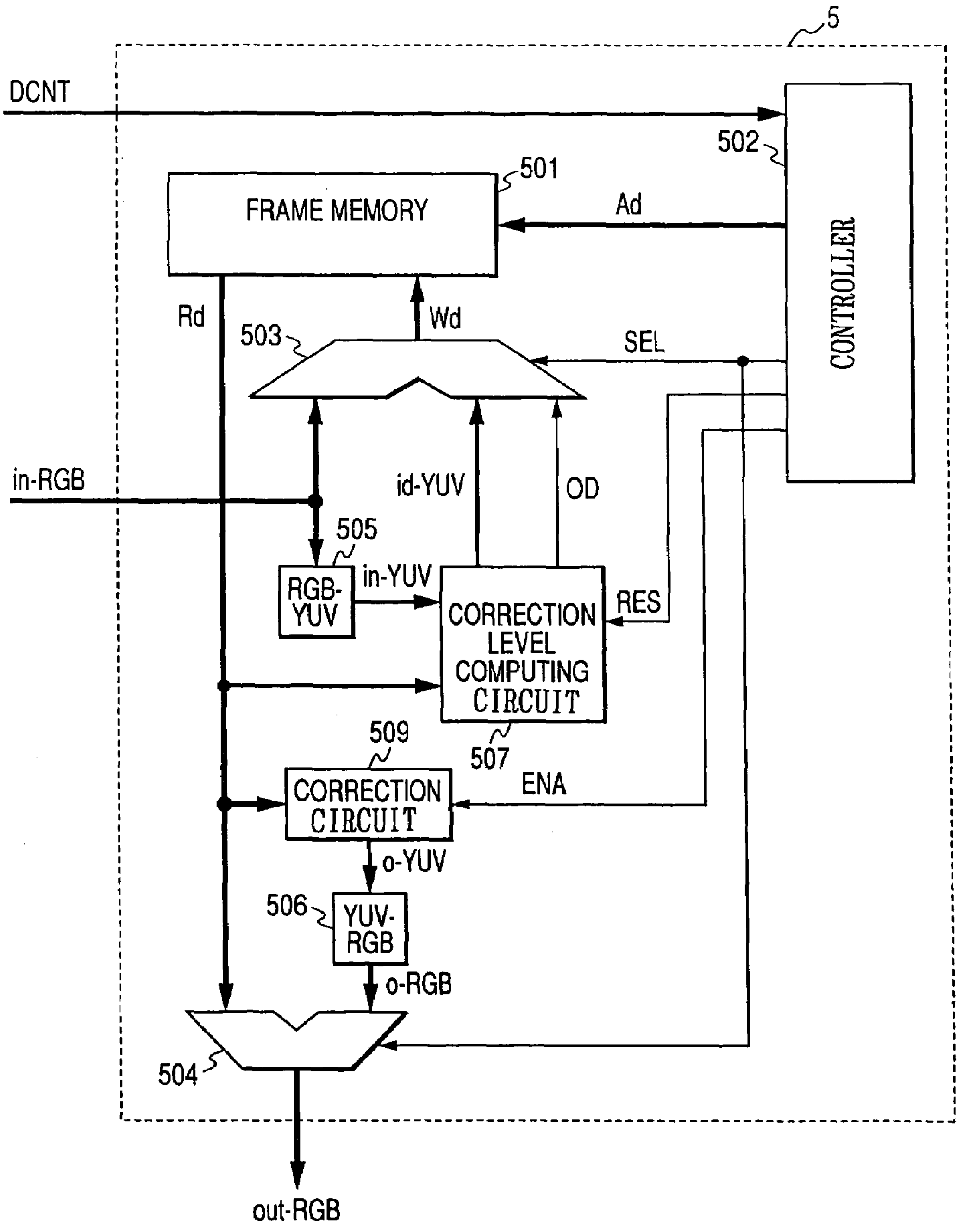
FIG. 3 is a block diagram of a video data processor in Example 1 of the present invention.

Next the configuration and operation of the video data processor 5 included in the signal driver will be explained. FIG. 3 is a block diagram of the video data processor 5. The video data processor 5 comprises a frame memory 501, a controller 502, a multiplexer circuit 503, a multiplexer circuit 504, an RGB-YUV converter circuit 505, a YUV-RGB converter circuit 506, a correction level computing circuit 507, and a correction circuit 509.

First, the respective constituent elements of the video data processor 5 will be explained. The frame memory 501 is a memory means for storing one frame of video signals. By way of example, in a case where video signals transferred from the CPU is formed of 8 bits per pixel, the memory capacity of the frame memory 501 needs to be m×n×8 bits. However, the video signals transferred from the CPU may be other than 8 bits per pixel. The frame memory 501 is controlled by an address control signal Ad outputted from the controller 502.

The controller 502 is controlled by the control signal DCNT outputted by the LCDM controller 4, and generates and outputs the address control signal Ad, an output changeover signal SEL for the multiplexer circuits 503, 504, an enable signal ENA for the correction circuit 509, and a reset signal RES for the correction level computing circuit 507.

Depending upon the output changeover signal SEL, a combination of the multiplexer circuit 503 and the multiplexer circuit 504 selects one of two different paths receiving the video signals in-RGB and outputting the video signals out-RGB. While the RGB-YUV converter circuit 505 is a circuit which converts video signals corresponding to RGB pixels into Y signals which represents luminance information and U, V signals which represent color-difference signals, the YUV-RGB converter circuit 506 is a circuit which converts video signals in the YUV format into video signals corresponding to RGB pixels. The correction level computing circuit 507 is a circuit which computes a correction level OD based upon two video signals supplied to the correction level computing circuit 507. The correction circuit 509 is a circuit which performs a correction on video signals based upon the correction level OD computed by the correction level computing circuit 507.

In the following, the operation of the video data processor 5 will be explained by dividing the explanation into a case of displaying still images on the liquid crystal display device 1 and a case of displaying moving images on the liquid crystal display device 1.

Firstly, the operation of displaying still images will be explained. In the case of displaying still images, during a time when displaying of video signals for the same frame is continued, the display is produced by reading one frame of video signals stored in the frame memory 501. For reading out video signals for pixels necessary for the displaying operation, the controller 502 transfers the address Ad corresponding to the video signals to the frame memory 501. The frame memory 501 outputs to the multiplexer circuit 504 video signals at the address designated by the address Ad as the read data Rd. In the case where the liquid crystal display device 1 displays still images, the multiplexer circuit 504 selects the read data Rd based upon the output changeover signal SEL and outputs the read data Rd to the display voltage output circuit 7 as the video signals out-RGB.

Further, in the case of the displaying of still images, at the time of changeover of frames, the CPU transfers the addresses of pixels associated with video signals to be changed and the new video signals, or one frame of video signals immediately after the changeover of frames to the liquid crystal display device 1. The video signals in-RGB transferred from the CPU is selected by the multiplexer circuit 503 based upon the output changeover signal SEL, and is outputted to the frame memory 501 as a write data Wd.

The controller 502 outputs addresses corresponding to the write data Wd, and thereby the video signals immediately after the changeover of frames are stored in the frame memory 501. At this time the LCDM controller 4 is already informed of the operation of the video data processor 5, and outputs the signal LCDM-SIG so that the CPU may transfer video signals during a period when the frame memory 501 is not performing the read operation. In this way, repeating of the above operation makes it possible for the liquid crystal display device 1 to display still images.

The following will explain the operation of the video data processor 5 in the case of displaying moving images, assuming that a frame period of the liquid crystal display device 1 is 1/60 sec and that the frame rate of moving images transferred from the CPU is 15 frames per sec. However, the frame frequency and the frame rate for the present invention are not limited to the above values.

In the case of displaying moving images also, at the time of changeover of frames, the CPU transfers the addresses of pixels associated with video signals to be changed and the new video signals, or one frame of video signals immediately after the changeover of frames to the liquid crystal display device 1. In the case of displaying moving images, the video signals in-RGB transferred from the CPU are converted into signals in-YUV which are the YUV signals by the RGB-YUV converter circuit 505, and the signals in-YUV is supplied to the correction level computing circuit 507. At this time, the RGB-YUV converter circuit 505 compresses the video signals from the CPU to obtain an area in the frame memory 501 for storing the correction levels OD computed by the correction level computing circuit 507 in addition to the video signals. For example, in the conversion into the YUV signals, the video signals are quantized by the number of bits smaller than the number of bits for the video signals transferred from the CPU. That is to say, the video signals are compressed by converting the in-RGB signals in the format of 8 bits for each of the three colors R, G, B to the YUV signals in the format of 6 bits. Further, for example, since the eye is more sensitive to luminance information than to color-difference information, a method may be utilized which compresses the color-difference signals.

Among generally known compressing formats, there are YUV422, YUV411 and YUV410. In the case of the YUV422 format, for example, from among the successive four picture dots (here, each picture dot is considered to be composed of three pixels, R, G, B), all the four picture dots are used for luminance information Y, and two picture dots are used for each of the color-difference information U and V. With this method, the color-difference information U and V are compressed to half, and therefore in a case where the YUV signals are quantized in the 8 bit format, when the successive four picture dots are considered, the amount of the data can be compressed to two-thirds. Further, the amount of data can be compressed by reducing the number of bits for quantization of the UV signals only.

The correction level computing circuit 507 computes the correction level OD by using two video signals, which are the video signals in-YUV transferred from the RGB-YUV converter circuit 505 and the video signals immediately before the changeover of frames stored in the frame memory 501. Therefore the controller 502 performs the control such that the video signals in-YUV and the video signals associated with the same pixels immediately before the changeover of frames are read out.

The correction levels OD may be obtained based upon the results of computing differences between the two supplied video signals. In this case, the correction levels OD may be computed by substitution of the differences into a formula, or may be selected from values in a table provided with correction levels OD corresponding to the differences and the video signals in advance. Further, the correction levels OD may be obtained based upon simple comparison results from a comparator and video signals, the correction levels OD may be set for respective ones of the YUV signals, or may be set for the luminance information Y, or may be set for respective ones of RGB pixels. Further, the correction levels OD may be set only for a case where video signals vary toward higher values, or may be set only for a case where video signals vary toward lower values, or may be set for two cases where video signals vary toward lower values and where video signals vary toward higher values.

The correction level computing circuit 507 outputs the correction level OD and the output id-YUV resulting from the video signal in-YUV used for computing the correction level OD, to the multiplexer circuit 503.

In a case where the liquid crystal display device 1 displays moving images, the multiplexer circuit 503 selects the id-YUV signals and the correction levels OD outputted from the correction level computing circuit 507 in accordance with the output changeover signal SEL and output them as the write data Wd to the frame memory 501.

The controller 502 outputs the addresses AD associated with the video signals id-YUV and stores the compressed video signal id-YUV and correction level OD in the frame memory 501.

As explained later, the correction levels OD for respective ones of the pixels stored in the frame memory 501 are brought into a reset state (a state of no correction) before the video signals immediately after the changeover of frames are transferred from the CPU.

By the above-explained operation, the frame memory 501 stores one frame of video signals immediately after the changeover of frames and the correction levels OD intended for pixels associated with video signals changed by the changeover of frames. Here the correction levels OD for pixels whose video signals are not changed remain in the reset state, and therefore no correction is made on those pixels.

Next, the operation of reading out from the frame memory 501 will be explained. Since the frame period is 1/60 sec, and the frame rate of the video signals transferred from the CPU is 15 frames per second, the liquid crystal display device 1 displays the same frame of the video signals four consecutive times.

Therefore, for the purpose of improving the performance of displaying moving images, it is desirable to produce a display by performing correction on video signals for the first frame immediately after the changeover of frames, based upon the correction levels OD, and by using the remaining three frames of video signals read out from the frame memory 501 without performing any corrections.

In the above operation, after the data stored in the frame memory 501 are replaced by the data corresponding to new video signals after the changeover of frames, the controller 502 causes the enable signal ENA to be ON so as to enable the correction circuit 509 to perform correction on the first frame displayed by the first reading operation only, thereby to perform the correction on the read data Rd, the video signals, from the frame memory 501 in accordance with the correction levels OD, and to output the corrected video signals as video signals o-YUV.

On the other hand, in the case of displaying the remaining three frames before occurrence of a subsequent change in a frame, the controller 502 causes the enable signal ENA to be OFF so as to disable the correction circuit 509 from performing correction and to output the video signals contained in the read data Rd from the frame memory 501 as the video signals o-YUV.

Here, in the correction based upon the correction levels OD, for example, the corrected video signals o-YUV may be computed by using a formula specified in connection with video signals and correction levels OD, or the corrected video signals o-YUV may be obtained by selection from among the amounts of correction provided in a table, based upon the video data contained in the read data Rd and the correction levels OD. In a case where the correction level OD is the same as in a reset state, by not performing the correction, the video signals contained in the read data Rd are outputted.

The YUV-RGB converter circuit 506 receives the video signals o-YUV outputted from the correction circuit 509, converts the video signals o-YUV to the RGB signals, and outputs them to the multiplexer circuit 504.

In the case of displaying moving images, the multiplexer circuit 504 selects o-RGB signals outputted from the YUV-RGB converter circuit 506, and outputs them to the display voltage output circuit 7.

As explained above, the controller 502 has caused the enable signal ENA to be OFF after completion of the operation of reading the frames which require the correction, and by causing the reset signal RES to be ON during a time when the frame memory 501 is not performing the reading operation, thereby resetting the correction levels OD outputted from the correction level computing circuit 507, the controller 502 performs the operation of rewriting all the data of the correction levels OD stored in the frame memory 501 into the reset state.

By completing the above operation before the transfer of new video signals from the CPU after the subsequent changeover of frames, even in a case where video signals represented by changes (differences) and their addresses only are transferred from the CPU, it is possible to store the correction levels OD for all the pixels corresponding to the changes (differences) only in one frame.

Since the video display data read out from the frame memory 501 are the data compressed by the RGB-YUV converter circuit 505, it is necessary to convert the compressed data into signals appropriate for the display voltage output circuit 7 by using the YUV-RGB converter circuit 506. In this case, since the display voltage output circuit 7 is intended for signals each composed of 8 bits for each of RGB colors, the video display data need to be converted to video signal data each composed of 8 bits for each of RGB colors.

In the example illustrated in FIG. 3, the correction is performed on the YUV signals themselves by the correction circuit 509, and thereafter the corrected YUV signals are converted to the RGB signals by the YUV-RGB converter circuit 506. However, the YUV signals may be converted to the RGB data by the YUV-RGB converter circuit 506 before the correction, thereafter the correction may be performed on the RGB data in accordance with the correction levels OD as in the case of the correction by the correction circuit 509.

In the above explanation, after the data stored in the frame memory 501 are replaced by new video signals after the changeover of frames, the correction is performed only on the first frame displayed by the first reading operation. The number of frames to be subjected to the correction is arbitrarily selected in accordance with the correction levels (the amount of overdriving).

Further, in the explanation in connection with FIG. 3, the video signals transferred from the CPU were assumed to be the RGB signals. However, the YUV signals can be selected as the video signals to be transferred from the CPU. In this case, the need for the RGB-YUV converter circuit 505 is eliminated. Further, the multiplexers 503, 504 can be omitted, and used as the write data Wd are the output id-YUV outputted from the correction level computing circuit 507 and the correction levels OD. The o-RGB signals generated by the YUV-RGB converter circuit 506 can be supplied to the display voltage output circuit 7.

Further, in a case where there is a need for providing in the frame memory 501 an area for storing the correction levels OD for overdriving the liquid crystal, it is necessary to provide a circuit for compressing the video signals transferred from the CPU before the correction level computing circuit 507.

Figure 4:
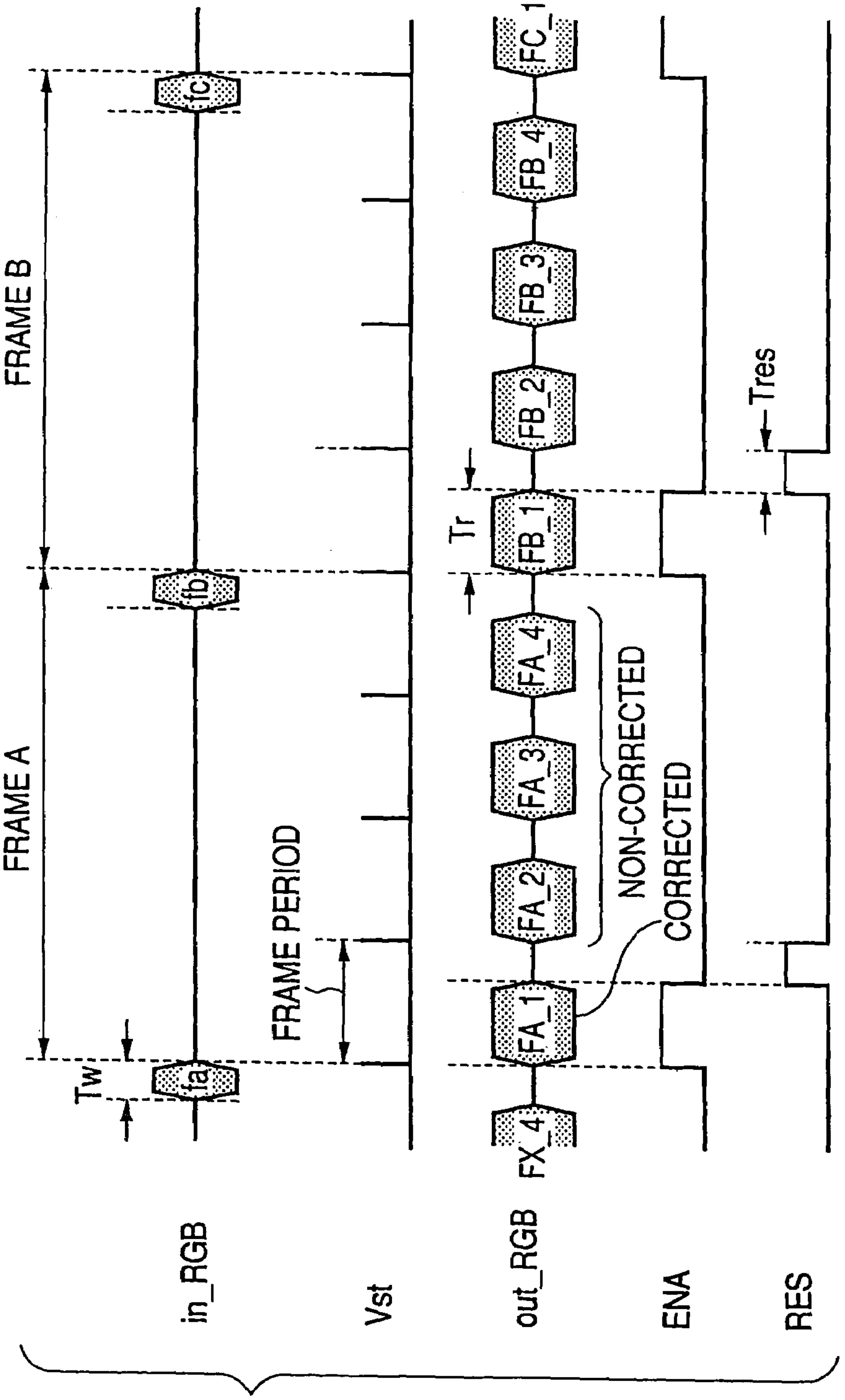
FIG. 4 is a timing chart for the video data processor in Example 1 of the present invention.

The following will explain the operation of the above-explained video data processor 5 in the case of displaying moving images by reference to FIG. 4. Vst is a signal contained in the scanning-driver control signal VCNT, is a start signal for the scanning driver of the liquid crystal display device 1 to apply a selection voltage to the scanning lines G, and is outputted with a frame period. Therefore the signal driver outputs display voltages equivalent to one frame successively in synchronism with the signal Vst, and the video data processor 5 outputs the out-RGB signals in synchronism with the VSt signal.

Here, in a case where moving pictures changes from frame A to frame B, the CPU transfers video signals fb as the in-RGB signals. Therefore, only during a time Tr of FB_1, the first display frame after the changeover of frames, the enable signal ENA is caused to be in an ON state (a Hi level in FIG. 4), and thereby the correction is performed on the video signals. During the subsequent three display frames FB_2, FB_3, FB_4, the enable signal ENA is caused to be in an OFF state (a Low level in FIG. 4), and thereby the video signals are outputted without being subjected to the correction. That is to say, during the time Tr of the display frame FB_1 the response speed of liquid crystal is increased by the correction, and during the subsequent display frames FB_2, FB_3, FB_4 the quality of displayed moving images can be improved by repeating displays and thereby preventing occurrence of flicker.

Further, by resetting the correction levels OD stored in the frame memory 501 during a time when the reset signal RES is in an ON state (a Hi level in FIG. 4), even in a case where the video signals representing changes (differences) only and their addresses are transferred from the CPU, the overdriving of liquid crystal is performed during the first display frame, the overdriving of liquid crystal is not performed during the subsequent display frames, therefore the overdriving of liquid crystal is not performed excessively, and as a result the liquid crystal display device 1 can be prepared for the subsequent changeover of frames.

As explained above, by employing Example 1 in accordance with the present invention, the quality of displayed moving images can be improved in the liquid crystal display device having a built-in frame memory and a signal driver controlled by a CPU or the like.

Example 2

Example 2 of a display device and a method of driving the display device in accordance with the present invention will be explained by reference to FIG. 5.

Example 2 in accordance with the present invention is identical to Example 1, except for the configuration of a video data processor included in a signal driver, and therefore the explanation of the configurations in Example 2 identical to those of Example 1 is omitted. In the following, the configuration and operation of the video data processor 5 of Example 2 will be explained by reference to FIG. 5.

Figure 5:
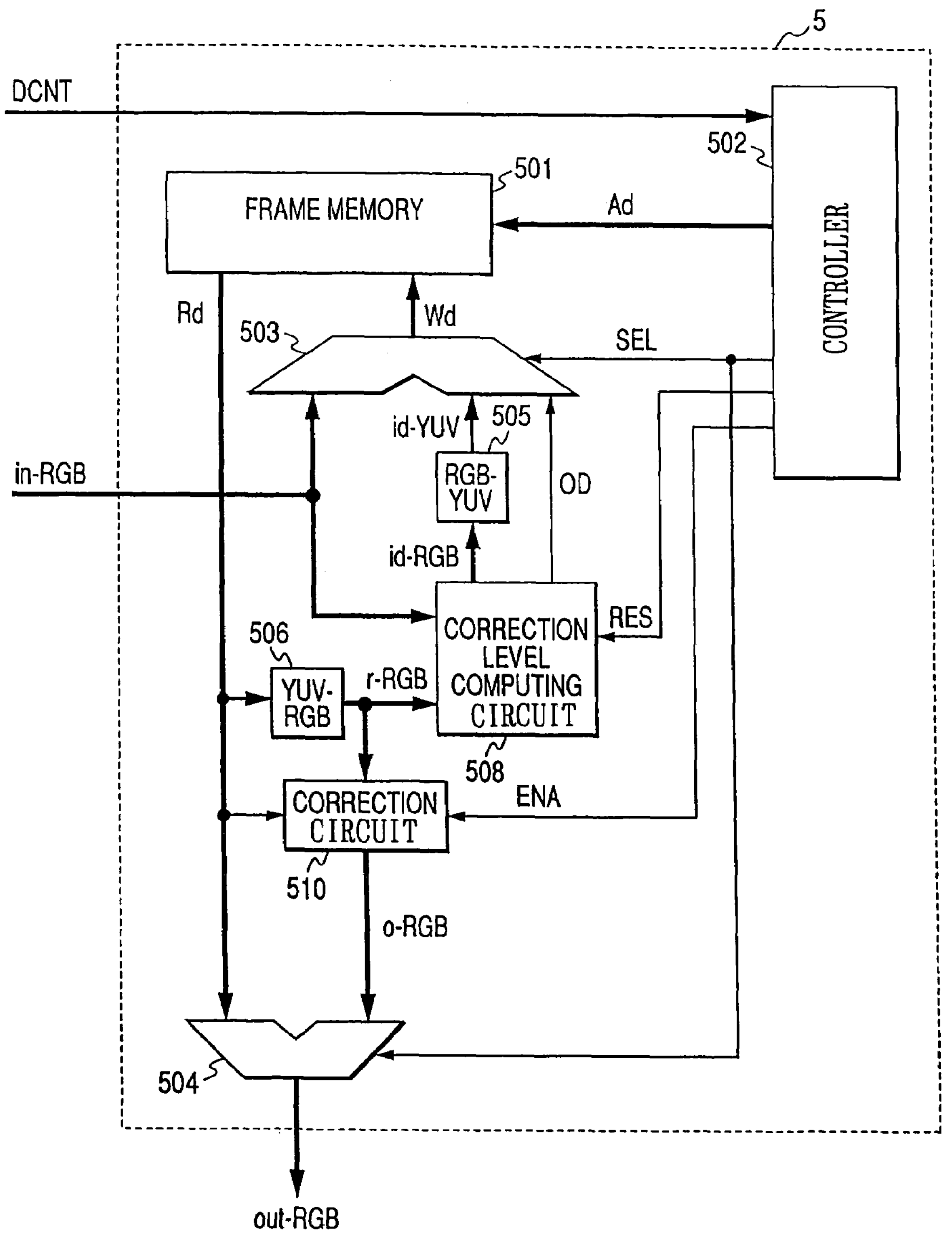
FIG. 5 is a block diagram of a video data processor in Example 2 of the present invention.

FIG. 5 is a block diagram of the video data processor 5 in Example 2 in accordance with the present invention. Constituent elements in Example 2 identical to those in Example 1 are denoted by the same reference numerals, and their explanation is omitted. In Example, two video signals inputted to the correction level computing circuit 508 are in the RGB format, and the correction level computing circuit 508 computes the correction levels OD based upon the above two video signals and outputs the correction levels OD. The correction circuit 510 performs correction on the inputted RGB video signals in accordance with the correction levels OD.

The following will explain the operation of the video data processor 5 shown in FIG. 5. The operation of displaying still images is the same as that in Example 1, its explanation is omitted here, and the operation of displaying moving images will be explained here. To simplify the explanation, the frame period of the liquid crystal display device 1 and the frame rate of moving images transferred from the CPU are assumed to be 1/60 sec and 15 frames per sec, respectively, as in the case of Example 1. However, the frame period and the frame rate for the present invention are not limited to the above values.

In the case of displaying moving images, the correction level computing circuit 508 receives video signals in-RGB transferred from the CPU. On the other hand, video signals before the changeover of frames are read out from the frame memory 501, are converted to video signals r-RGB in the RGB format by the YUV-RGB converter circuit 506, and the video signals r-RGB are inputted to the correction level computing circuit 508. Therefore the correction level computing circuit 508 can obtain the correction levels OD based upon the video signals before and after the changeover of video frames.

The correction levels OD can be obtained by the results of computing differences between the two inputted video signals. In this case, the correction levels OD may be computed by substitution of the differences into a formula, or may be selected from values in a table provided with correction levels OD corresponding to the differences and the video signals in advance. Further, the correction levels OD may be obtained based upon simple comparison results from a comparator and video signals. Further, the correction levels OD may be set only for a case where video signals vary toward higher values, or may be set only for a case where video signals vary toward lower values, or may be set for two cases where video signals vary toward lower values and where video signals vary toward higher values.

To store the correction levels OD computed by the correction level computing circuit 508 and the video signals after the changeover of video frames used in the computation of the correction levels OD, the video signals id-RGB outputted from the correction level computing circuit 508 are converted to the YUV signals id-YUV by the RGB-YUV converter circuit 505, and then are compressed.

The multiplexer circuit 503 selects the correction levels OD outputted from the correction level computing circuit 508 and the id-YUV signals outputted from the RGB-YUV converter circuit 505 under the control of the output changeover signal SEL, and outputs the correction levels OD and the id-YUV signals to the frame memory 501 as the write data Wd.

The controller 502 outputs the addresses Ad associated with the video signals id-YUV, and stores the compressed video signals id-YUV and the correction levels OD in the frame memory 501.

By the above-described operation, the frame memory 501 has stored one frame of video signals after the changeover of frames and the correction levels OD for the pixels intended for pixels associated with video signals changed by the changeover of frames.

Next, the operation of reading out from the frame memory 501 will be explained. Since the frame period is 1/60 sec, and the frame rate of the video signals transferred from the CPU is 15 frames per second, the liquid crystal display device 1 displays the same frame of the video signals four consecutive times.

Therefore, for the purpose of improving the performance of displaying moving images, it is desirable to produce a display by performing correction on video signals for the first frame immediately after the changeover of frames, based upon the correction levels OD, and by using the remaining three frames of video signals read out from the frame memory 501 without performing any corrections.

First, the video signals read out from the frame memory 501 for the operation of displaying are converted to the video signals r-RGB by the YUV-RGB converter circuit 506, and then are outputted to the correction circuit 510.

In the above operation, after the data stored in the frame memory 501 are replaced by the data corresponding to new video signals after the changeover of frames, the controller 502 causes the enable signal ENA to be ON so as to enable the correction circuit 510 to perform correction on the first frame displayed by the first reading operation only, thereby to perform the correction on the video signals r-RGB derived from the read data Rd from the frame memory 501 in accordance with the correction levels OD, and to output the corrected video signals o-RGB.

On the other hand, in the case of displaying the remaining three frames before occurrence of a subsequent change in a frame, the controller 502 causes the enable signal ENA to be OFF so as to disable the correction circuit 510 from performing correction and to output the video signals r-RGB contained in the read data Rd from the frame memory 501 without performing the correction.

Here, in the correction based upon the correction levels OD, for example, the corrected video signals o-RGB may be computed by using a formula specified in connection with video signals and correction levels OD, or the corrected video signals o-RGB may be obtained by selection from among the amounts of correction provided in a table, based upon the video signals r-RGB and the correction levels OD. In a case where the correction level OD is the same as in a reset state, the video signals are outputted by not performing the correction.

The video signals o-RGB outputted from the correction circuit 510 are selected by the multiplexer circuit 504, and then are transferred to the display voltage output circuit 7.

As explained above, the controller 502 has caused the enable signal ENA to be OFF after completion of the operation of reading the frames which require the correction, and by causing the reset signal RES to be ON during a time when the frame memory 501 is not performing the reading operation, thereby resetting the correction levels OD outputted from the correction level computing circuit 508, the controller 502 performs the operation of rewriting all the data of the correction levels OD stored in the frame memory 501 into the reset state.

By completing the above operation before the transfer of new video signals from the CPU after the subsequent changeover of frames, even in a case where video signals represented by changes and their addresses only are transferred from the CPU, it is possible to store the correction levels OD for all the pixels corresponding to the changes only in one frame.

In the above explanation, after the data stored in the frame memory 501 are replaced by new video signals after the changeover of frames, the correction is performed only on the first frame displayed by the first reading operation. The number of frames to be subjected to the correction can be selected arbitrarily.

As explained above, by employing Example 1 in accordance with the present invention, the quality of displayed moving images can be improved in the liquid crystal display device having a built-in frame memory and a signal driver controlled by a CPU or the likes as in the case of employing Example 1.

Example 3

In the video data processor 5 of Example 1 in accordance with the present invention, video signals are compressed for the purpose of storing the correction levels OD in the frame memory 501 in addition to video signals. Example 3 includes the configuration of Example 1, and further, as shown in FIG. 6, by providing a correction level storing circuit 601 which stores correction levels in the video data processor 5 in addition to the frame memory 501, it is possible to store the correction levels without compressing the video signals, and thereby it is possible to improve the quality of displayed moving images as in the case of Example 1.

Figure 6:
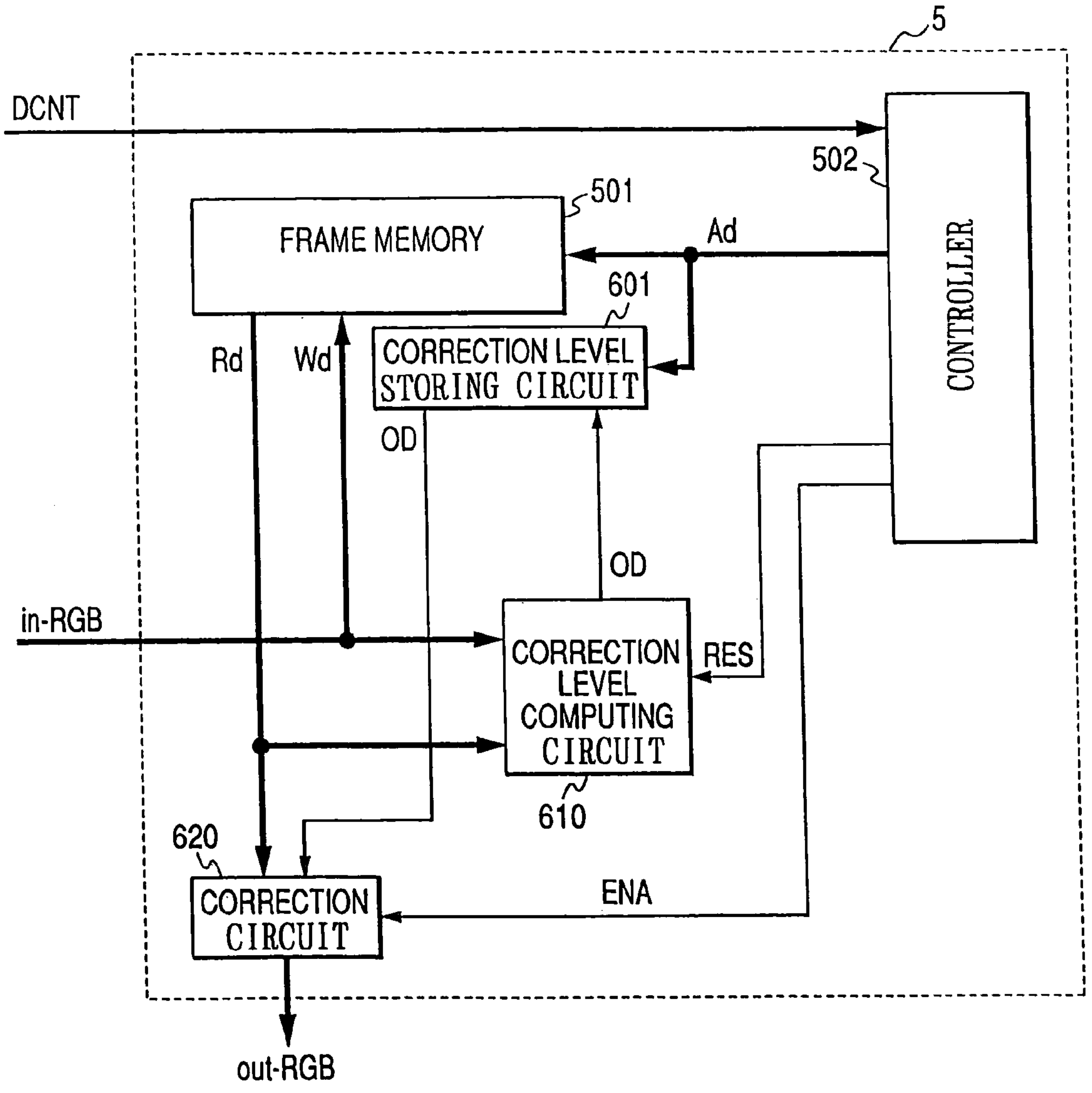
FIG. 6 is a block diagram of a video data processor in Example 3 of the present invention.

In FIG. 6, the correction levels OD from the correction level computing circuit 610 are stored in the correction level storing circuit 601. As in the case of Example 1, the correction circuit 620 performs correction on the video signals read out from the frame memory 501, based upon the correction levels OD read out from the correction level storing circuit 601. Therefore, the multiplexer circuits 503, 504 and the converter circuits 505, 506 can be omitted from the configuration of Example 1 shown in FIG. 3.

Figure 7:
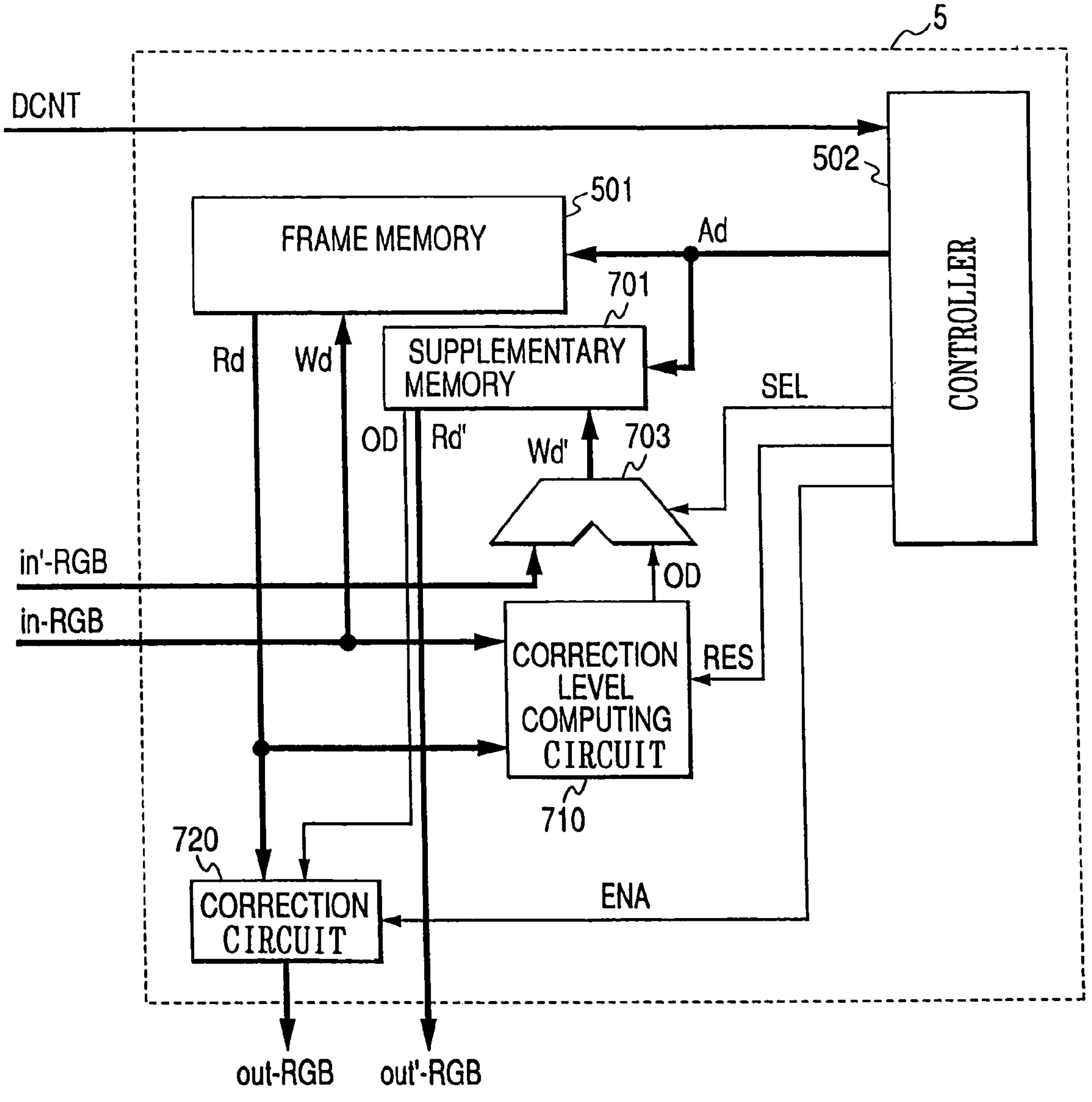
FIG. 7 is a block diagram of another video data processor in Example 3 of the present invention.

Further, in a case where a signal driver drives the liquid crystal display section 2 and another supplementary display section, and its video data processor 5 is provided with the frame memory 501 intended for the liquid crystal display section 2 and a supplementary memory 701 intended for the supplementary display section as shown in FIG. 7, by using the supplementary memory 701 as a correction level storing circuit which stores the correction levels OD in the case of displaying moving images, and by using the supplementary memory 701 as the supplementary memory for the supplementary display section in the case of displaying still images, the quality of displayed moving images can be improved.

In FIG. 7, selected by the multiplexer circuit 703 are either the correction levels OD from the correction level computing circuit 710 or the input video signals in'-RGB for the supplementary display section, and are stored in the supplementary memory 701. In the case of displaying moving images, the correction levels OD are selected and are stored in the supplementary memory 701, and in the case of displaying still images, the input video signals in'-RGB are selected and are stored in the supplementary memory 701.

In the case of displaying moving images, the stored input video signals in'-RGB are subjected to the correction by the correction circuit 720 using the stored correction levels OD as in the case of Example 1. In the case of displaying still images, the output video signals out'-RGB are displayed in the supplementary display section.

The above explanations of the examples in accordance with the present invention have been made in connection with the cases where the liquid crystal are used in the display sections, and the present invention is applicable to other types of display elements (for example, organic electroluminescent displays) in a case where correction levels are obtained based upon video signals of two frames before and after the changeover of video frames, and where a display is produced based upon signals having been subjected to correction in accordance with the correction levels.

Although in the above-explained examples of the liquid crystal display devices in accordance with the present invention, the signal driver, the scanning driver and the power supply circuit are provided separately from each other, the present invention is not limited to this configuration, and the signal driver and the scanning driver may be integrated into one circuit, for example.

What is claimed is:

1. A display device which corrects externally supplied video signals and displays said corrected externally-supplied video signals, said display device comprising:

a display unit having a plurality of pixels disposed correspondingly to intersections of a plurality of scanning lines and a plurality of signal lines;

a scanning driver which applies a scanning signal to said plurality of scanning lines; and a signal driver which applies display voltages to said plurality of signal lines, and said signal driver comprising:

a first converter which converts a format of said externally supplied video signals into a first format;

a memory which stores said video signals from said first converter temporarily and has a capacity for storing information on said plurality of pixels of said display unit;

a correction circuit which computes correction values based upon said video signals from said first converter and said video signals stored in said memory and corrects said video signals from said first converter based upon said correction values; and a second converter which converts said first format of said video signals from said correction circuit to a format of said display voltages, wherein said memory stores said correction values also, and said correction circuit corrects said video signals stored in said memory based upon said correction values stored in said memory.

2. A display device according to claim 1, wherein said format of said externally supplied video signals is an RGB format, said first format is a YUV format with Y representing a luminance signal and U and V representing two color-difference signals, and said format of said display voltages is the RGB format, and data of said video signals in the YUV format are smaller in quantity than data of said video signals in the RGB format.

3. A display device according to claim 1, wherein said correction by said correction circuit is performed to improve a response speed of liquid crystal in said display unit.

4. A display device according to claim 1, wherein said memory is a frame memory capable of storing a frame of said externally supplied video signals.

5. A display device which corrects externally supplied video signals and displays said corrected externally-supplied video signals, said display device comprising:

a display unit having a plurality of pixels disposed correspondingly to intersections of a plurality of scanning lines and a plurality of signal lines;

a scanning driver which applies a scanning signal to said plurality of scanning lines; and a signal driver which applies display voltages to said plurality of signal lines, and said signal driver comprising:

a first converter which converts a format of said externally supplied video signals into a first format;

a memory which stores said video signals from said first converter temporarily or said externally supplied video signals before entering said first converter and has a capacity for storing information on said plurality of pixels of said display unit;

a correction circuit which computes correction values based upon said video signals from said first converter and said video signals stored in said memory and corrects said video signals from said first converter based upon said correction values;

a second converter which converts said first format of said video signals from said correction circuit to a format of said display voltages;

a first multiplexer which chooses one from (1) said externally supplied video signals before entering said first converter and (2) said correction values and said video signals from said correction circuit; and a second multiplexer which chooses one from (1) said video signals and (2) said video signals from said second converter, wherein, in a case where said first multiplexer chooses said externally supplied video signals before entering said first converter and said second multiplexer chooses said video signals, said memory stores said externally supplied video signals before entering said first converter, and said display unit displays said externally supplied video signals before entering said first converter without correction performed by said correction circuit; and in a case where said first multiplexer chooses said video signals from said correction circuit and said second multiplexer chooses said video signals from said second converter, said memory stores said correction values and said video signals from said correction circuit, said correction circuit corrects said video signals stored in said memory based upon said correction values stored in said memory, and said display unit displays said video signals from said correction circuit.

6. A display device according to claim 5, wherein said format of said externally supplied video signals is an RGB format, said first format is a YUV format with Y representing a luminance signal and U and V representing two color-difference signals, and said format of said display voltages is the RGB format, and data of said video signals in the YUV format are smaller in quantity than data of said video signals in the RGB format.

7. A display device according to claim 5, wherein said correction by said correction circuit is performed to improve a response speed of liquid crystal in said display unit.

8. A display device according to claim 5, wherein said memory is a frame memory capable of storing a frame of said externally supplied video signals.

9. A display device which corrects externally supplied video signals and displays said corrected externally-supplied video signals, said display device comprising:

a display unit having a plurality of pixels disposed correspondingly to intersections of a plurality of scanning lines and a plurality of signal lines;

a scanning driver which applies a scanning signal to said plurality of scanning lines; and a signal driver which applies display voltages to said plurality of signal lines, and said signal driver comprising:

a first memory which stores said externally supplied video signals temporarily and has a capacity for storing information on said plurality of pixels of said display unit;

a correction circuit which computes correction values based upon said externally supplied video signals and said video signals stored in said memory and corrects said externally supplied video signals based upon said correction values;

a second memory which stores said correction values, where said correction circuits corrects said externally supplied video signals stored in said first memory based upon said correction values stored in said second memory;

another display unit;

wherein said signal driver is configured so as to drive both said display unit and said another display unit, said second memory stores video data to be displayed on said another display unit in a case where said signal driver drives both said display unit and said another display unit, and said second memory stores said correction values for said video signals to be displayed on said display unit in a case where said signal driver drives said display unit only.

10. A display device according to claim 9, wherein said format of said externally supplied video signals is a YUV format with Y representing a luminance signal and U and V representing two color-difference signals, and a format of said video signals to be supplied from said correction circuit to said display unit is converted from the YUV format to an RGB format.

11. A display device according to claim 9, wherein said correction by said correction circuit is performed to improve a response speed of liquid crystal in said display unit.

12. A display device which corrects externally supplied video signals and displays said corrected externally-supplied video signals, said display device comprising:

a display unit having a plurality of pixels disposed correspondingly to intersections of a plurality of scanning lines and a plurality of signal lines;

a scanning driver which applies a scanning signal to said plurality of scanning lines; and signal driver which applies display voltages to said plurality of signal lines, and said signal driver comprising:

a memory which stores said externally supplied video signals and has a capacity for storing information on said plurality of pixels of said display unit;

a first converter which converts a format of said video signals read out from said memory to a format of said externally supplied video signals;

a correction circuit which computes correction values based upon said video signals from said first converter and said externally supplied video signals, and which corrects said externally supplied video signals based upon said correction values, a second converter which changes said format of said externally supplied video signals;

a first multiplexer which chooses one from (1) said externally supplied video signals before entering said first converter and (2) said correction values and said video signals from said second converter; and a second multiplexer which chooses one from (1) said video signals stored in said memory (2) said video signals from said correction circuit, wherein, in a case where said first multiplexer chooses said externally supplied video signals and said second multiplexer chooses said video signals stored in said memory, said memory stores said externally supplied video signals, and said display unit displays said video signals stored in said memory without correction performed by said correction circuit; and in a case where said first multiplexer chooses said correction values and said video signals from said second converter and said second multiplexer chooses said video signals from said correction circuit, said memory stores said correction values and said video signals from said second converter, said correction circuit corrects said video signals stored in said memory based upon said correction values stored in said memory, and said display unit displays said video signals from said correction circuit.

13. A display device according to claim 12, wherein said format of said externally supplied video signals is an RGB format, said second converter converts said video signals in the RGB format to video signals in a YUV format with Y representing a luminance signal and U and V representing two color-difference signals, and said first converter converts said video signals in the YUV format to video signals in the RGB format, and data of said video signals in the YUV format are smaller in quantity than data of said video signals in the RGB format.

14. A display device according to claim 12, wherein said correction by said correction circuit is performed to improve a response speed of liquid crystal in said display unit.

15. A display device according to claim 12, wherein said memory is a frame memory capable of storing a frame of said externally supplied video signals.

* * * * *